(12) United States Patent
D'Souza et al.

(10) Patent No.: US 12,712,437 B2
(45) Date of Patent: Aug. 18, 2026

(54) GATE-CONTROL OF A POWER-SWITCH IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Ningbo Aura Semiconductor Co., Ltd, Ningbp (CN)

( * ) Notice: Subject to any disclaimer, the term of this patent is extended or adjusted under 35 U.S.C. 154(b) by 296 days.

(21) Appl. No.: 18/484,458

(22) Filed: Oct. 11, 2023

(65) Prior Publication Data

US 2024/0128852 A1 Apr. 18, 2024

(30) Foreign Application Priority Data

Oct. 14, 2022 (IN) ............................. 202241058815

(51) Int. Cl.
*H02M 1/088* (2006.01)
*H02M 3/158* (2006.01)

(52) U.S. Cl.
CPC ........... *H02M 1/088* (2013.01); *H02M 3/158* (2013.01)

(58) Field of Classification Search
CPC ....... H02M 1/0029; H02M 3/158; H02M 1/08
See application file for complete search history.

(56) References Cited

U.S. PATENT DOCUMENTS 6,265,915 B1 7/2001 Rider et al.
7,046,051 B2 5/2006 Melbert et al.
8,305,053 B2 11/2012 Truong et al.
10,224,824 B2 3/2019 Iorio et al.
10,574,226 B2 2/2020 Kumar et al.
10,819,237 B1 * 10/2020 Petrina ................ H02M 3/1582
2005/0040434 A1 2/2005 Hornkamp
2006/0120004 A1 6/2006 Thiery et al.

(Continued)

FOREIGN PATENT DOCUMENTS

CN 107395039 A 11/2017
EP 3108580 A1 12/2016

(Continued)

OTHER PUBLICATIONS

Xugang Ke, et al, A Tri-Slope Gate Driving GaN DC-DC Converter With Spurious Noise Compression and Ringing Suppression for Automotive Applications, IEEE Journal of Solid-State Circuits, Date of Publication: Sep. 29, 2017, 14 pages, vol. 53, Issue: 1, IEEE.

(Continued)

*Primary Examiner* — Alex Torres-Rivera
(74) *Attorney, Agent, or Firm* — IPHORIZONS PLLC; Narendra Reddy Thappeta

(57) ABSTRACT

A high-side gate driver driving a high-side switch of a switching converter determines a first transition between a first sub-duration and a second sub-duration as being when a voltage at the switching node (of the high-side switch) becomes less than a voltage at the power terminal by a first threshold voltage. The gate driver determines a second transition between the second sub-duration and a third sub-duration as being when a voltage of the control signal crosses a threshold voltage of the high-side switch. In an embodiment, the second sub-duration corresponds to Miller Plateau.

19 Claims, 8 Drawing Sheets

(56) References Cited

U.S. PATENT DOCUMENTS

2015/0035584 A1 2/2015 Fujita
2021/0050782 A1* 2/2021 Bandyopadhyay .......................... H03K 17/0822
2022/0006416 A1 1/2022 Song
2022/0182041 A1* 6/2022 Tesu ........................ H02M 1/08
2022/0278614 A1* 9/2022 Newlin ............... H02M 1/0032

FOREIGN PATENT DOCUMENTS

EP 3270513 A1 1/2018
WO WO2022120012 A1 6/2022

OTHER PUBLICATIONS

Smart Power Stage (SPS) Module with Integrated Temperature Monitor, https://www.mouser.com/datasheet/2/149/FDMF5826DC-269145.pdf, May 2016, 26 Pages.
Robert Taylor, et al, Controlling switch-node ringing in synchronous buck converters, Analog Applications Journal, May 3, 2012, 05 Pages.

* cited by examiner

GATE-CONTROL OF A POWER-SWITCH IN A SWITCHING CONVERTER

PRIORITY CLAIM

The instant patent application is related to and claims priority from the co-pending India provisional patent application entitled: "HS Gate control", Serial No. 202241058815, Filed: 14 Oct. 2022, which is incorporated in its entirety herewith to the extent not inconsistent with the description herein.

BACKGROUND

Technical Field

Embodiments of the present disclosure relate generally to switching converters, and more specifically to gate-control of a power-switch in a switching converter.

Related Art

Switching converter refers to a component which generates a regulated DC (direct current) voltage from an input supply voltage by employing one or more switches, as is well known in the relevant arts. Typically, a switching converter transforms the input supply voltage into a pulsed voltage by operating switch(es), the pulsed voltage then being smoothed using capacitors, inductors, and other elements to generate the regulated DC voltage.

Power is supplied from the input to the output by turning switches (e.g., power-MOSFETs) ON and OFF until the desired voltage is reached and to maintain the voltage constant thereafter. Switching converters are used in components such as regulated power supplies, which in turn are used in devices such as computers and mobile phones, as is also well known in the relevant arts.

A switching converter often contains a pair of switches driving an inductor. Each switch is typically implemented as a power-switch, and may be implemented as a transistor (e.g., power-MOSFET). A power-switch is a transistor (or an equivalent switch-like-controllable component) that is optimized for handling large currents through it and voltages across it. The pair of switches are connected in series between an input supply voltage (typically large) and a reference terminal (e.g., ground). The switch coupled closer to the input voltage (source of input power to the converter) is termed as the high-side (HS) switch, while the other one is termed as a low-side (LS) switch. A control circuit switches on the HS and LS switches in successive non-overlapping time durations to cause the switch that is currently ON to drive the inductor in the corresponding duration.

Gate-control refers to applying of drive voltages on the gate (control) terminal of the HS and/or LS switches in a controlled manner. Specifically, the drive voltage characteristics applied to the gate terminal of the HS switch may be of particular concern. For example, an abrupt (very fast) switching OFF of the HS switch may result in undesirable ringing effects and/or high voltages across the drain and source terminals of the HS switch that can potentially stress or damage the HS switch. Hence, the switching-OFF operation must be controlled such that the gate voltage waveform be such as to avoid or at least minimize any undesirable effects.

Aspects of the present disclosure are directed to such gate-control of power-switches in a switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
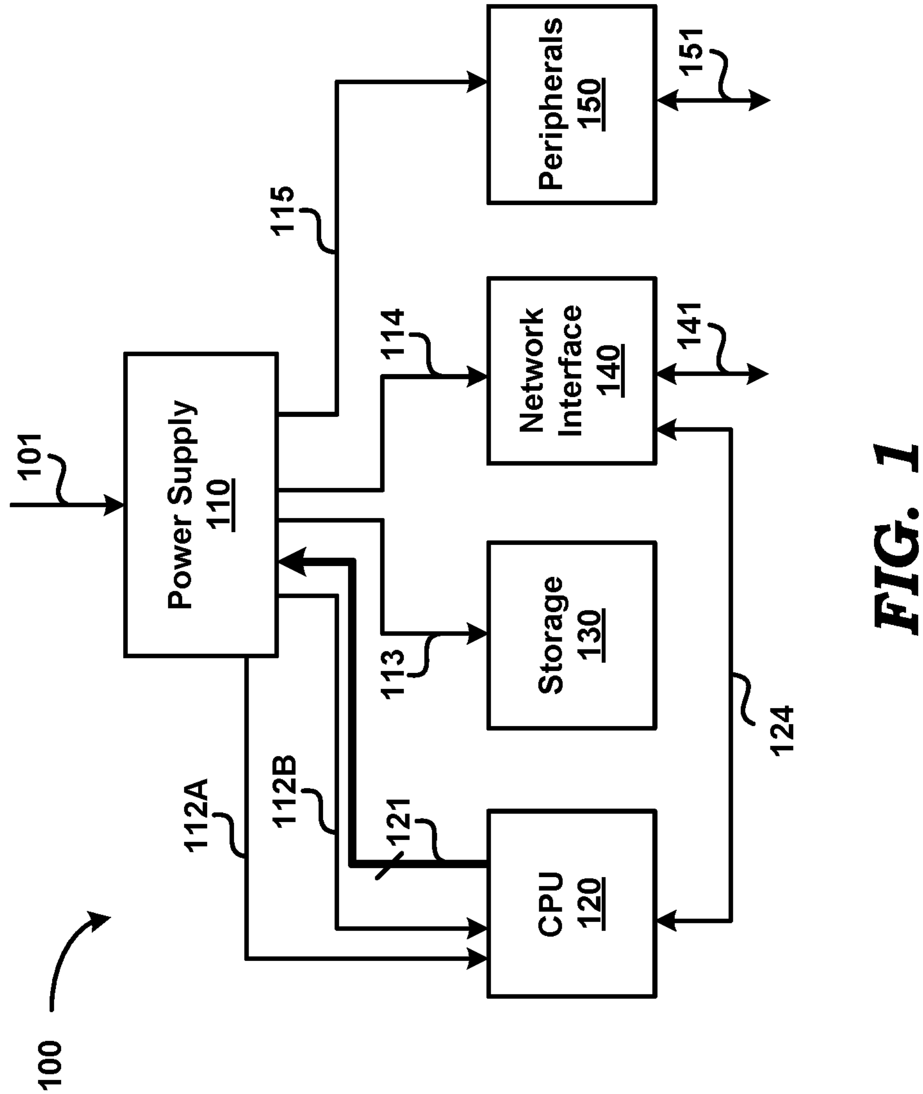
FIG. 1 is a block diagram of an example system in which several aspects of the present disclosure can be implemented.

Aspects of the present disclosure are directed to gate-control of a power-switch in a switching converter. In an embodiment, a power stage contains a high-side switch and a low-side switch connected in series at a switching node, with the high-side switch and the low-side switch being connected in series between a power terminal provided with a power source and a constant reference potential. An inductor is provided between the switching node and an output node at which the power stage provides a regulated voltage.

A high-side gate driver applies a first control signal at a first control terminal of the high-side switch to place the high-side switch in ON and OFF states in successive durations, and a low-side gate driver applies a second control signal at a second control terminal of the low-side switch to place the low-side switch in OFF and ON states in corresponding successive durations to cause generation of the regulated voltage.

In order to transition the high-side switch from the ON state to the OFF state, the high-side gate driver changes a magnitude of the first control signal at a first rate, a second rate and then at a third rate in three consecutive sub-durations constituted of a first sub-duration, a second sub-duration and a third sub-duration respectively, wherein the second rate is less than each of the first rate and the third rate.

The high-side gate driver determines a first transition between the first sub-duration and the second sub-duration as being when a voltage at said switching node becomes less than a voltage at said power terminal by a first threshold voltage.

According to another aspect, the high-side gate driver determines a second transition between the second sub-duration and the third sub-duration as being when a voltage of the first control signal crosses a threshold voltage of the high-side switch.

In an embodiment, the high-side gate driver includes a skewed inverter having a trip-point equal to the threshold voltage of the high-side switch such that an output of the skewed inverter represents the second transition. The high-side gate driver may also include a comparator circuit whose reference voltage is the voltage of the switching node. The high-side switch and the low-side switch respectively provide the regulated voltage in a first phase and a second phase periodically based on an input control signal received from a component external to the power stage.

In an embodiment, the power switch is part of a power stage in a voltage regulator module (VRM), though the features can be implemented in various other environments as will be apparent to a skilled practitioner based on the disclosure provided herein.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific power-save state in which the device/component (e.g., a processor) is currently operating in (in terms of power consumption), such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provide two-way communication between system 100 and a computer network, or in general Internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 via path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters (switching converters) within to generate the power supply voltages. Power supply 110 responds to signals from CPU 120 received on path 121 to reduce/increase current output based on the specific signal (e.g., PS1, PS2 and PS3).

In the embodiment, power supply 110 is a voltage regulator module (VRM), sometimes also called processor power module (PPM), and contains one or more step-down switching (buck) converters to generate several smaller voltages from a higher-voltage supply source. In other embodiments however, other types of switching converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module

Figure 2:
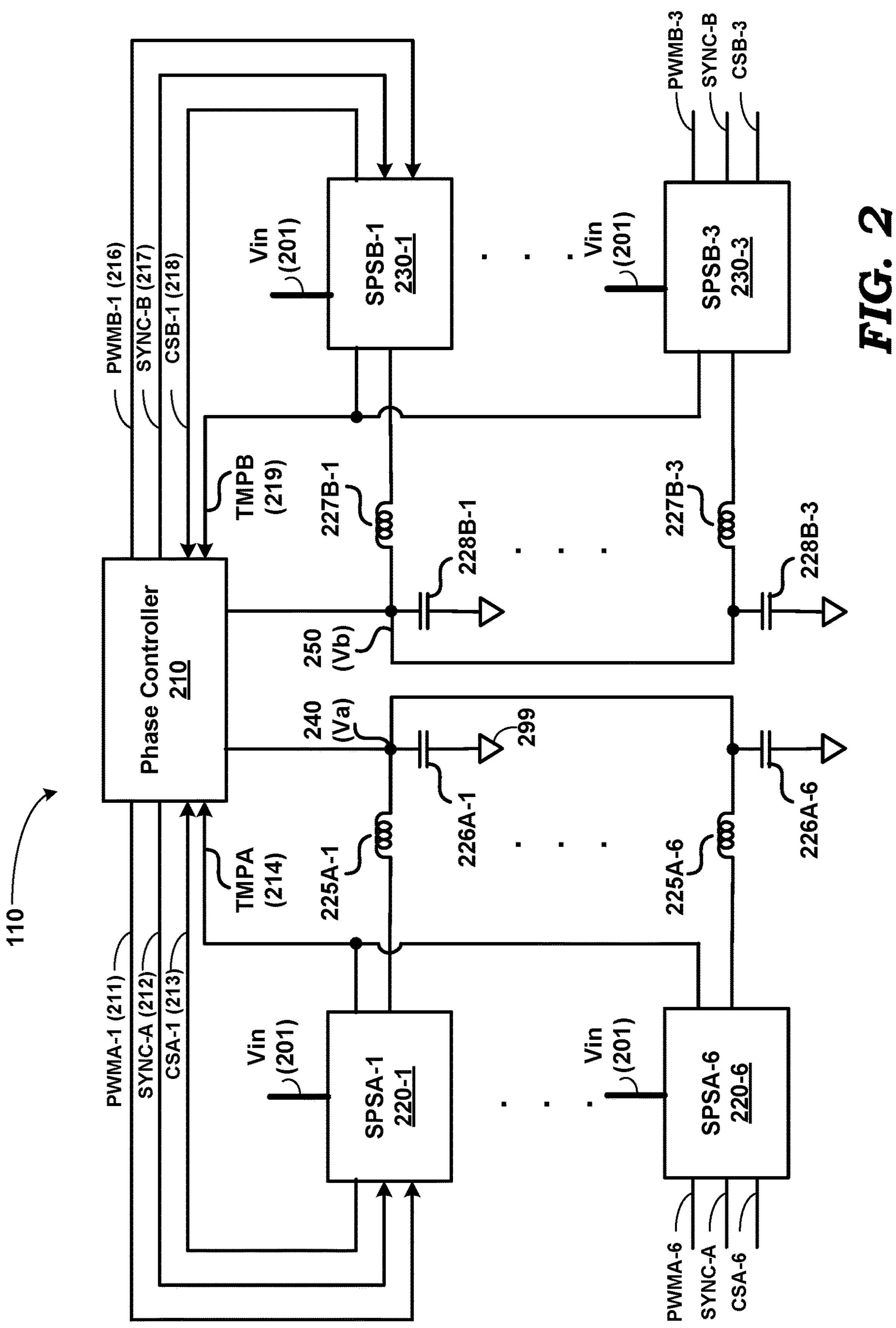
FIG. 2 is a block diagram illustrating the details of a multi-phase switching converter, in an embodiment of the present disclosure.

FIG. 2 is a block diagram illustrating the details of a VRM in an embodiment of the present disclosure. Power supply 110 is implemented as a Voltage Regulator Module and is shown containing phase controller 210, smart power stage (SPS) SPSA-1 (220-1) through SPSA-6 (220-6), SPSB-1 (230-1) through SPSB-3 (230-3), inductors 225A-1 through 225A-6, and 227B-1 through 227B-3 and capacitors 226A-1 through 226A-6, and 228B-1 through 228B-3. Power supply voltage Va (240) is generated by a 6-phase buck converter (there are six SPSes—220-1 through 220-6), while power supply Vb (250) is generated by a 3-phase buck converter (there are three SPSes—230-1 through 230-3). Vin (201) can correspond to voltage of power source on path 101 of FIG. 1, while nodes/paths 240 and 250 can correspond to paths 112A and 112B of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

Each SPS (or in general, a 'power stage') may be implemented to contain a high-side switch, a low-side switch, gate-drive circuitry for the two switches, a temperature monitor circuit and an inductor-current sense (or emulation) circuit to provide information indicating the magnitude of inductor current to phase controller 210. The current supplied by an SPS, and therefore the corresponding inductor current waveform generally depends on the load current drawn from the supply voltage, although the high-side switch and low-side switch of an SPS may be viewed as 'driving' the inductor. Each SPS receives a source of power as an input which is connected to the high-side switch (shown in detail in sections below). In FIG. 2, the supply source is numbered 201, and has a voltage Vin. An example value of Vin in a VRM is about 22 volts (V).

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and provides a pulse-width modulated (PWM) signal, which may, for example, be a signal that may be of a fixed frequency but variable duty cycle, and whose frequency is potentially modifiable by phase controller 210 based on load current demands. The PWM signal controls the opening and closing of high-side switch and low-side switch of the phase. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same converter may be staggered, i.e., delayed with respect to each other in phase such that typically no two high-side switches or low-side switches in the converter (i.e., respective SPSes) will be overlapping. Such a technique is employed for reasons such as, for example, to ensure that the peak instantaneous current drawing from Vin is relatively low (or zero) at all times.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210. The maximum of the TMP outputs of a phase is driven on the wired connection.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSes of the same converter share a single SYNC signal.

Signal CS (current sense) is an input to phase controller 210 from an SPS, and contains information regarding the magnitude of the inductor current of that phase. The information can be in the form of a current, voltage, digital values, etc.

Some undesirable effects of switching-OFF HS switch of a power stage at a fast rate are briefly noted next.

4. Problems with Fast Switch-OFF

Figure 3B:
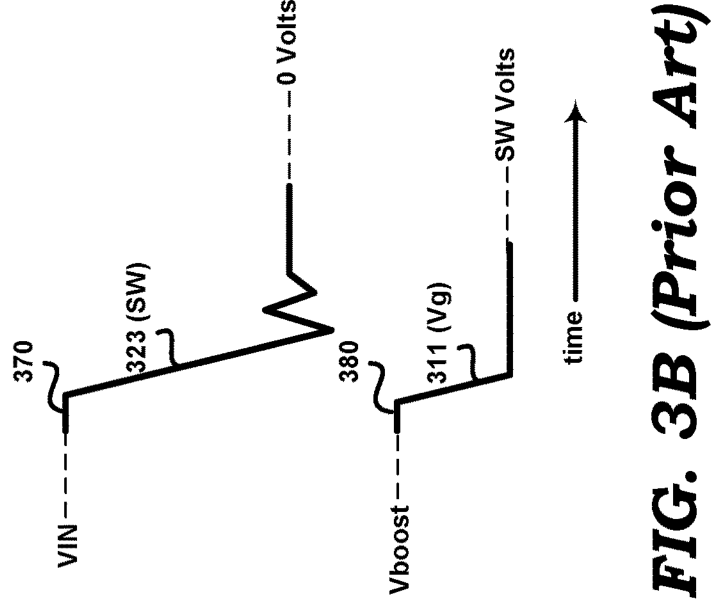
FIG. 3B is a timing diagram illustrating waveforms of voltages at various nodes of the power stage in the prior technique.
Figure 3A:
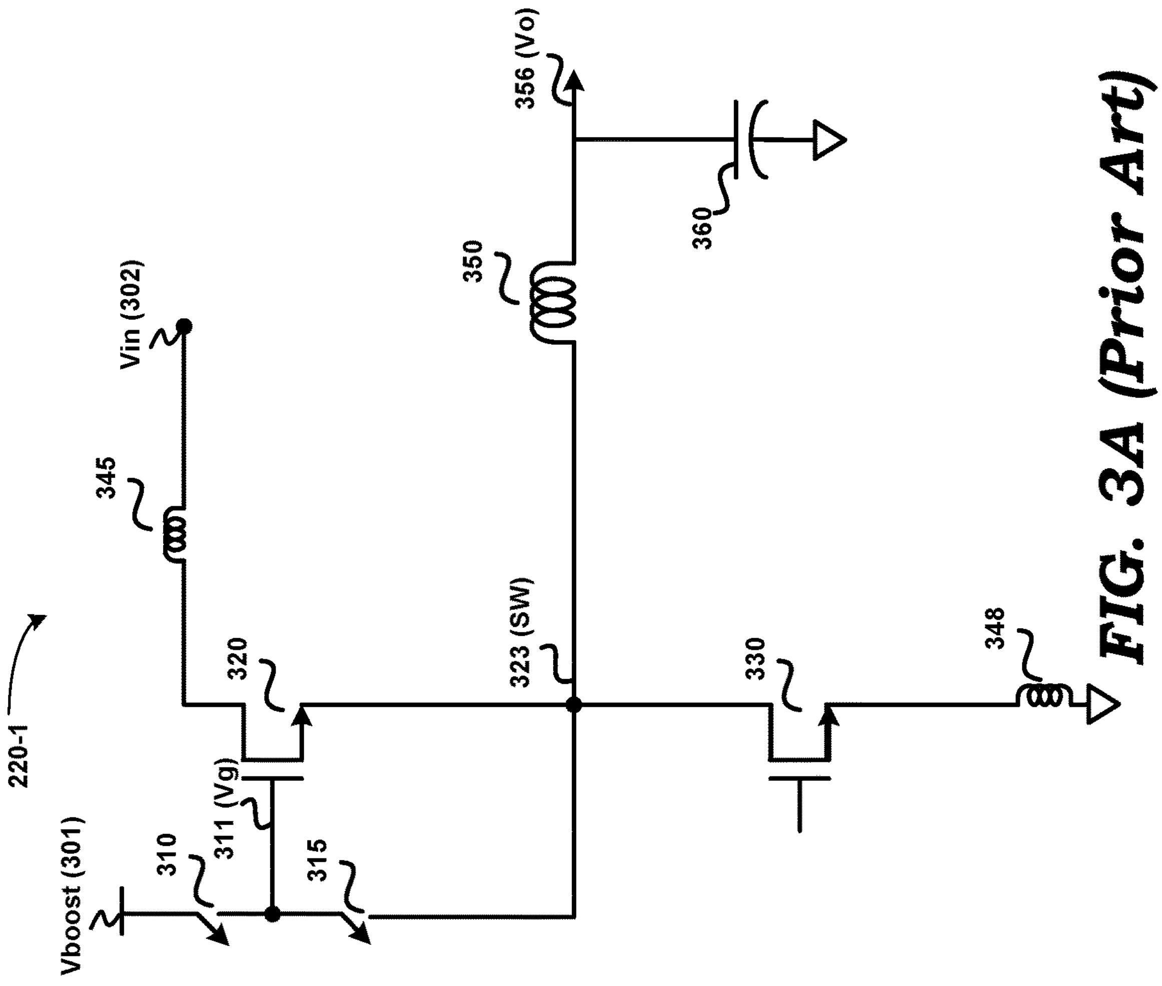
FIG. 3A is a block diagram illustrating the implementation details of a power stage in a prior technique.

FIGS. 3A and 3B are diagrams used to illustrate undesirable effects that may result due to switching-OFF HS switch of a power stage at a fast rate in a prior power stage. FIG. 3A shows the necessary details of the prior power stage. Transistors 320 and 330 are N-channel transistors and represent the HS and LS switches respectively. Inductor 350 and capacitor 360 of the power stage are also shown. Switches 310 and 315 represent the driving mechanism inside a gate driver of HS switch 320. Inductors 345 and 348 represent parasitic inductances. Vboost (301) represents bootstrap capacitor voltage.

A very fast switch-OFF of HS switch 320 is accomplished by opening switch 310 and closing switch 315 in quick succession. As a result, the voltage Vg on gate terminal (311) (with respect to that on node SW) changes very quickly from Vboost (301) to the voltage Vsw on switching node (SW) 323. The change in gate voltage Vg (311) is depicted in FIG. 3B. The change from voltage Vboost to the voltage at SW node is shown as happening very quickly (ideally instantaneously, i.e., with zero fall-time).

During operation of the prior power stage, when HS switch 430 is ON (LS switch 330 being OFF), load current is drawn from Vin via output node Vo (356), and the ON-resistance Rds(ON) of switch 320 is very small (of the order of 6 to 10 milli-ohms). The voltage at node SW equals Vin volts. An example value of Vin is 22V. When switch 320 is turned OFF, the voltage at node SW becomes slightly negative (approximately –0.7V) due to current flow via ground, the parasitic drain-source body-diode (not shown in FIG. 3A) of LS switch 330 and the load connected to Vo (356), as is also well known in the relevant arts.

Upon switching OFF of HS switch 320, there is a sharp change in the value of the inductor-current (current through inductor 350). This leads to a large rate of change of current (dI/dt) flowing through parasitic inductors 345 and 348, which leads to ringing (unwanted oscillations) on both source and drain of HS switch. The additional voltage due to ringing may be as large as 8-10V, leading to high voltage stress (voltage of the order of 30V across drain and source terminals) of HS switch 320. Such high voltage could potentially damage HS switch 320, thus negatively impacting the reliability of the switch and hence the power stage.

One way to reduce the ringing is to control the slew-rate of the gate-control (rate of change of gate voltage with respect to time) of HS switch 320, and slow it down enough to lower the ringing voltage to 2-3V. However, making the slew-rate too less would result in decreasing the slew-rate of voltage at node SW as well, leading to power dissipation (switching loss) across the HS switch, making the switch less efficient. In addition, there may be stringent delay specifications that may limit the time within which the HS switch has to respond to the PWM signal from the phase controller. Therefore, the response time of HS switch may need to be limited to a small value, for example, 25 nano-seconds. Consequently, the slew-rate of gate-control of HS switch needs to be better controlled to meet the delay specifications and slew-rate requirements, while also not compromising reliability and efficiency of the switch.

Figure 4:
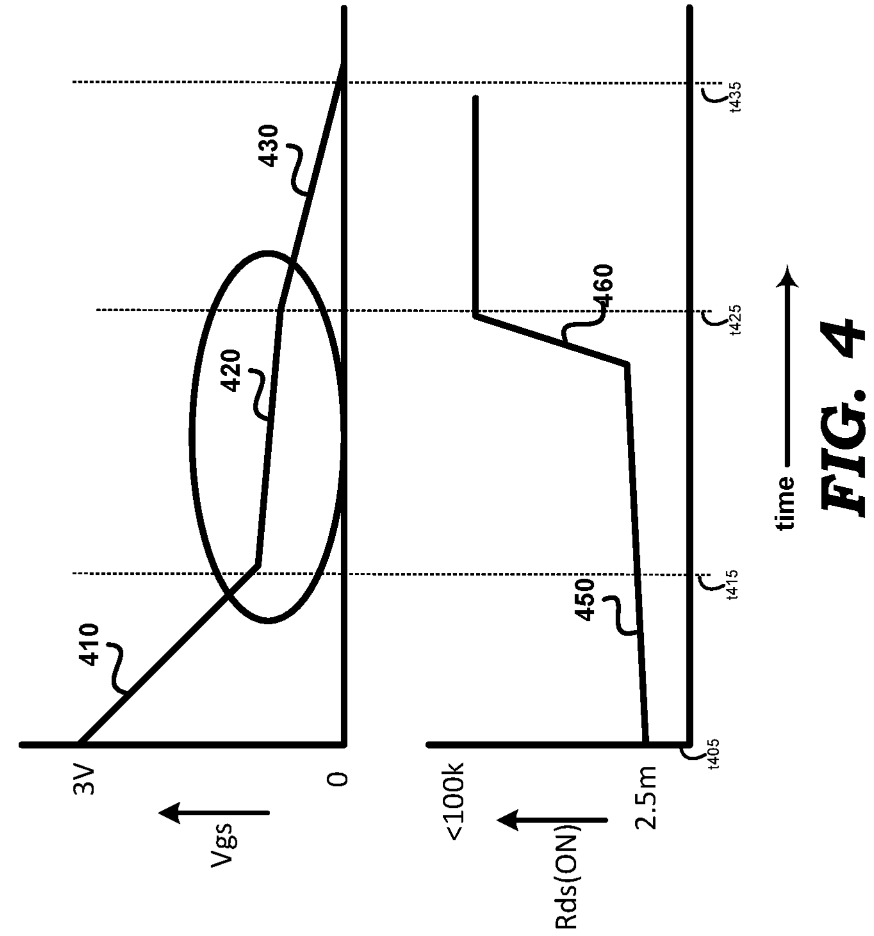
FIG. 4 is a timing diagram illustrating variation of ON-resistance relative to changes in gate-source voltage during switch-OFF of high-side switch, in an embodiment of the present disclosure.

The relationship between variation of gate-source voltage (Vgs) of HS switch and the corresponding variation in Rds (resistance across drain and source of HS switch (which may be a MOSFET)) is depicted in the waveform of FIG. 4, and is described next.

5. Variation of Rds(ON) During Switch-OFF of HS Switch

FIG. 4 is an example timing diagram (not to scale) depicting the relationship between variations in the applied gate-source voltage and ON-resistance (Rds) of a HS switch of a power stage. Specifically, there are shown waveforms of gate-source voltage (Vgs) (which is the same as signal 513 of FIG. 5) applied by high-side gate driver 510 of HS switch and ON-resistance Rds(ON) across the HS switch. It is noted herein that only waveforms as relevant to the understanding of the disclosure are depicted in FIG. 4. It may be appreciated that the values of voltages/resistances depicted in FIG. 4 are for illustrative purposes only and the actual values during operation may differ from those depicted in FIG. 4, as will be apparent to a skilled practitioner.

Prior to time t405, it is assumed that the HS switch is fully ON. Thus, Vgs is shown as having a value of 3V and Rds(ON) is shown as having a value of 2.5 milli-ohms. Thus, the value of Vgs is well above the threshold voltage, Vth, required to turn ON the HS switch.

At t405, it is assumed that HS switch is desired to be switched OFF, in response to logic LOW of a PWM signal (not shown in FIG. 4) received from the phase controller. In response, gate voltage of the HS switch is pulled down by corresponding means (e.g., a driver circuit). Thus, in sub-duration t405-*t*415, the value of Vgs is shown reducing from 3V (region 410) and approaching (but not below) threshold voltage Vth. Since Vgs of the HS switch continues to be above Vth, Rds(ON) continues to have a low value, increasing only slightly, as depicted by waveform 450 in FIG. 4.

At t415, the value of Vgs approaches close to (but not below) Vth and the HS switch begins to turn OFF. At some point in the duration t415-*t*425 (closer to time t425 than to time t415), Vgs crosses (goes below by a few tens of milli-volts but not substantially below) Vth, HS switch turns OFF and correspondingly, Rds(ON) reaches maximum value (increases steeply). It may be appreciated that the specific point in time when Rds(ON) begins to rise steeply would depend on the power-switch characteristics. Due to the sudden/drastic variation in the value of Rds(ON) around the threshold voltage Vth (of the HS switch) in the region 420 (and hence corresponding large dI/dt variation of the currents in the parasitic inductances noted above), it is particularly important to reduce the slew-rate of the gate-control Vgs in region 420 (as is shown in FIG. 4) in order to avoid or at least minimize ringing effects noted above. Starting from t425, since the HS switch has turned OFF completely, Vgs can be pulled down quickly to zero. Region 420 is termed the 'Miller plateau', as is well known in the relevant arts.

Accordingly, the Vgs waveform during switching-OFF of the HS switch can be designed to have three distinct consecutive sub-durations based on variation of Rds(ON) and Vgs:

- a first sub-duration (region 410) before the Miller plateau, in which Vgs can be reduced quickly till it approaches close to (but not below) Vth, with the value of Rds(ON) consequently varying only slightly;
- a second sub-duration representing the Miller plateau (region 420), in which Vgs needs to drop only a little, i.e., be relatively constant, with Rds(ON) drastically increasing at around Vth of the switch; and
- a third sub-duration after the Miller plateau (region 430), in which Vgs can be quickly reduced to zero volts, with Rds(ON) already having reached its maximum value.

It may be appreciated that a magnitude of gate-drive at a respective rate may therefore be applied to the gate terminal of HS switch in each of the three sub-durations to minimize the ringing effect noted above. Thus, the slew-rate (rate of change of gate-source voltage of HS switch with respect to time) would have different magnitudes in each of the three sub-durations.

Specifically, in the first sub-duration (region 410), a magnitude of gate-drive at a fast slew-rate (first rate) may be applied to the gate terminal of the HS switch without the undesirable effect of ringing, since Rds(ON), and therefore drain-source current (Ids), across the HS switch, do not vary steeply. Thus, a fast slew-rate in the first sub-duration may be employed without negatively impacting reliability of the HS switch.

In the second sub-duration (region 420), Rds(ON) changes steeply when the value of Vgs is around Vth of the HS switch, and therefore a magnitude of gate-drive at a slow slew-rate (second rate, lesser than the first rate) may be applied to minimize the ringing effect noted above.

In the third sub-duration (region 430), a magnitude of gate-drive at a fast slew-rate (third rate, higher than the second rate) may be applied, since Rds(ON) does not vary (since the value of Vgs has fallen below Vth and the HS switch has turned OFF). In other words, since the switching-OFF of HS switch has already taken place, a higher slew-rate may be employed to pull the gate of the HS switch to zero volts (or the reference voltage SW in FIG. 5, described below) quickly without negatively impacting reliability of the HS switch.

It may be appreciated that the transitions to and from the Miller plateau, i.e., between region 410 and region 420, and between region 420 and region 430 respectively)) cannot be estimated accurately, and may vary from part to part as well as with process corners of the IC (integrated circuit) and temperature. Thus, it is desirable to have a mechanism to detect appropriate time to start and stop the slow slew-rate (second rate) in the Miller plateau region.

A power stage implemented according to several aspects of the present disclosure detects such transitions and correspondingly controls the slew-rate of the gate-drive voltage of the HS switch based on the transitions, as described in detail below with respect to example embodiments.

6. Smart Power Stage (SPS/Power Stage)

Figure 5:
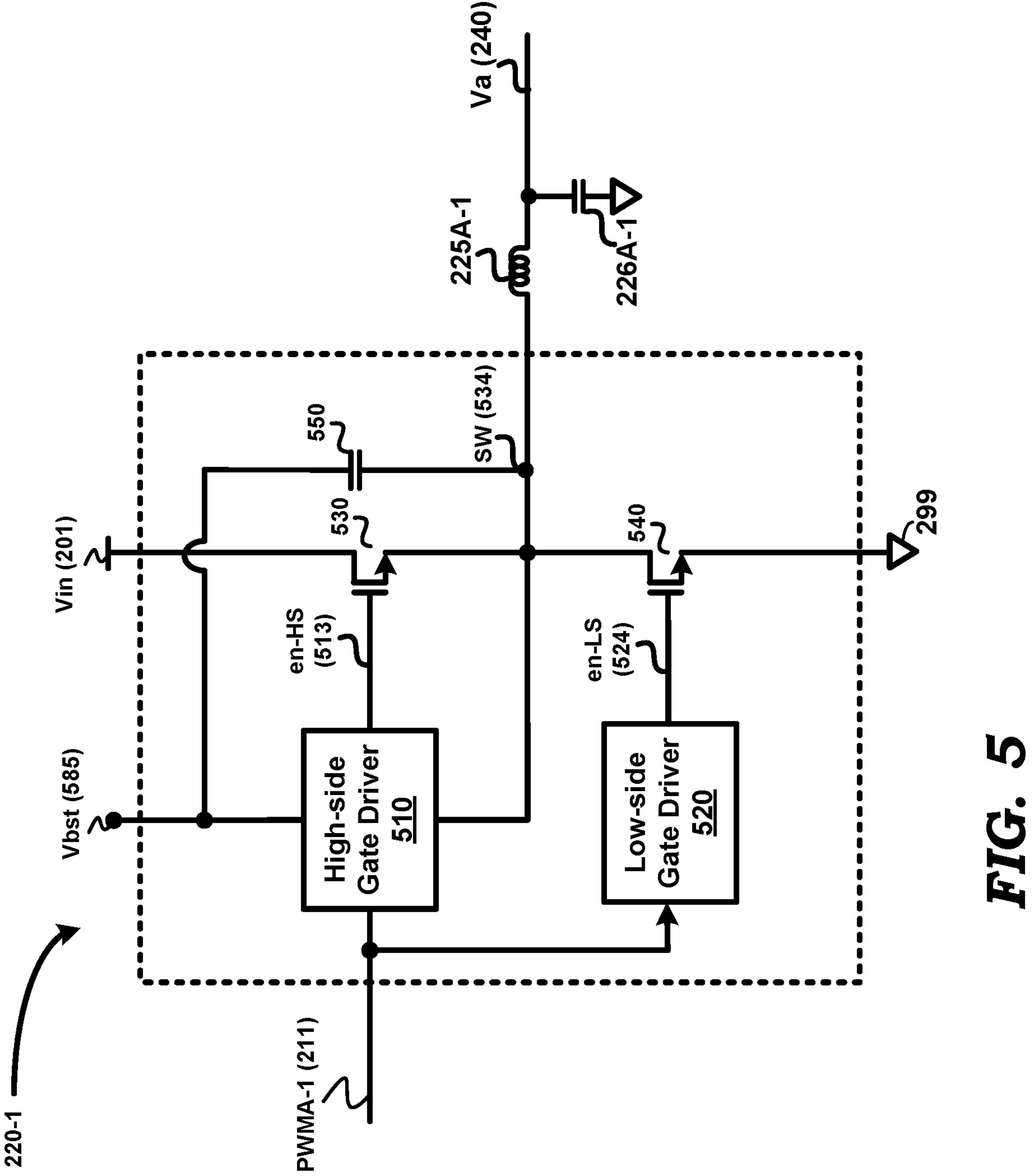
FIG. 5 is a block diagram illustrating the implementation details of a power stage in an embodiment of the present disclosure.

FIG. 5 is a block diagram illustrating the implementation of an SPS in an embodiment of the present disclosure. SPSA-1 (220-1) is shown in detail in FIG. 5. The other SPSes can also be implemented to be similar to SPSA-1. However, in other embodiments, an SPS can have more or fewer blocks. SPSA-1 is shown containing high-side (HS) gate driver 510, HS switch 530, low-side (LS) gate driver 520, LS switch 540 and bootstrap capacitor 550. Also shown in FIG. 5 are inductor 225A-1 and capacitor 226A-1. Node 240 provides the supply voltage Va.

HS gate driver 510 receives binary signal PWMA-1 (211), and in response to the logic level of PWMA-1 generates the appropriate voltage (or drive) on path 513 (en-HS) to turn ON and turn OFF HS switch 530 in corresponding intervals indicated by PWMA-1.

LS gate driver 520 receives binary signal PWMA-1 (211), and in response to the logic level of PWMA-1 generates the appropriate voltage (or drive) on path 524 (en-LS) to turn ON and turn OFF LS switch 540 in corresponding intervals indicated by PWMA-1.

HS switch 530 and LS switch 540 are each shown implemented as a MOSFET (Metal Oxide Semiconductor Field Effect Transistor) with gate drivers 510 and 520 driving the gate terminals of the MOSFETs, although other implementations for the switches are possible. Although HS gate driver and LS gate driver are shown to be implemented as respective blocks in FIG. 5, a single block may implement the functionality of both HS and LS gate drivers with appropriate changes to the circuit, as will be apparent to a skilled practitioner by reading the disclosure herein.

In the example of FIG. 5, when PWMA-1 is a logic HIGH (a first phase), HS gate driver 510 generates respective appropriate voltage on path 513 (en-HS) to switch ON MOSFET 530, while LS gate driver 520 generates respective appropriate voltage on path 524 (en-LS) to switch OFF MOSFET 540. When PWMA-1 is a logic LOW (a second phase), HS gate driver 510 generates respective appropriate voltage on path 513 (en-HS) to switch OFF MOSFET 530, while LS gate driver 520 generates respective appropriate voltage on path 524 (en-LS) to switch ON MOSFET 540.

As is well known in the relevant arts, a bootstrap capacitor (such as bootstrap capacitor 550) is employed to drive HS switch 530 with a very low ON-resistance, when HS switch 530 is implemented using an n-type MOSFET (NMOS). Specifically, the gate terminal of HS switch 530 needs to be driven to a voltage whose magnitude is sufficiently higher than Vin (201) in order to drive HS switch ON with a very low ON-resistance (Rds(ON)). This is needed since as HS switch starts turning ON, LS switch 540 has already been switched OFF, the voltage at node SW (534) starts increasing towards Vin, and eventually equals Vin (which may be, for example, 22V or so). Therefore, the gate voltage of HS switch 530 may need to be at a minimum of Vin+Vth (Vth being threshold voltage of HS switch/MOSFET) to turn ON the HS switch. To turn HS switch strongly/fully ON (so that it has a very low ON-resistance), the gate voltage may need to be sufficiently higher than (Vin+Vth), for example, (Vin+Vth+Vgs-delta), with the additional Vgs-delta enabling the switch to be strongly ON. Bootstrap capacitor is charged at the beginning of operation of SPS 220-1 to a voltage Vbst (585) that is equal to or greater than (Vth+Vgs-delta).

As noted above, HS gate driver 510 controls the slew-rate of the gate-control of HS switch 530 in each of the three sub-durations noted above during switch-OFF of the HS switch. The description is continued to illustrate the implementation details of HS gate driver 510 in an embodiment to determine the transitions between the sub-durations.

7. High-Side Gate Driver

Figure 6:
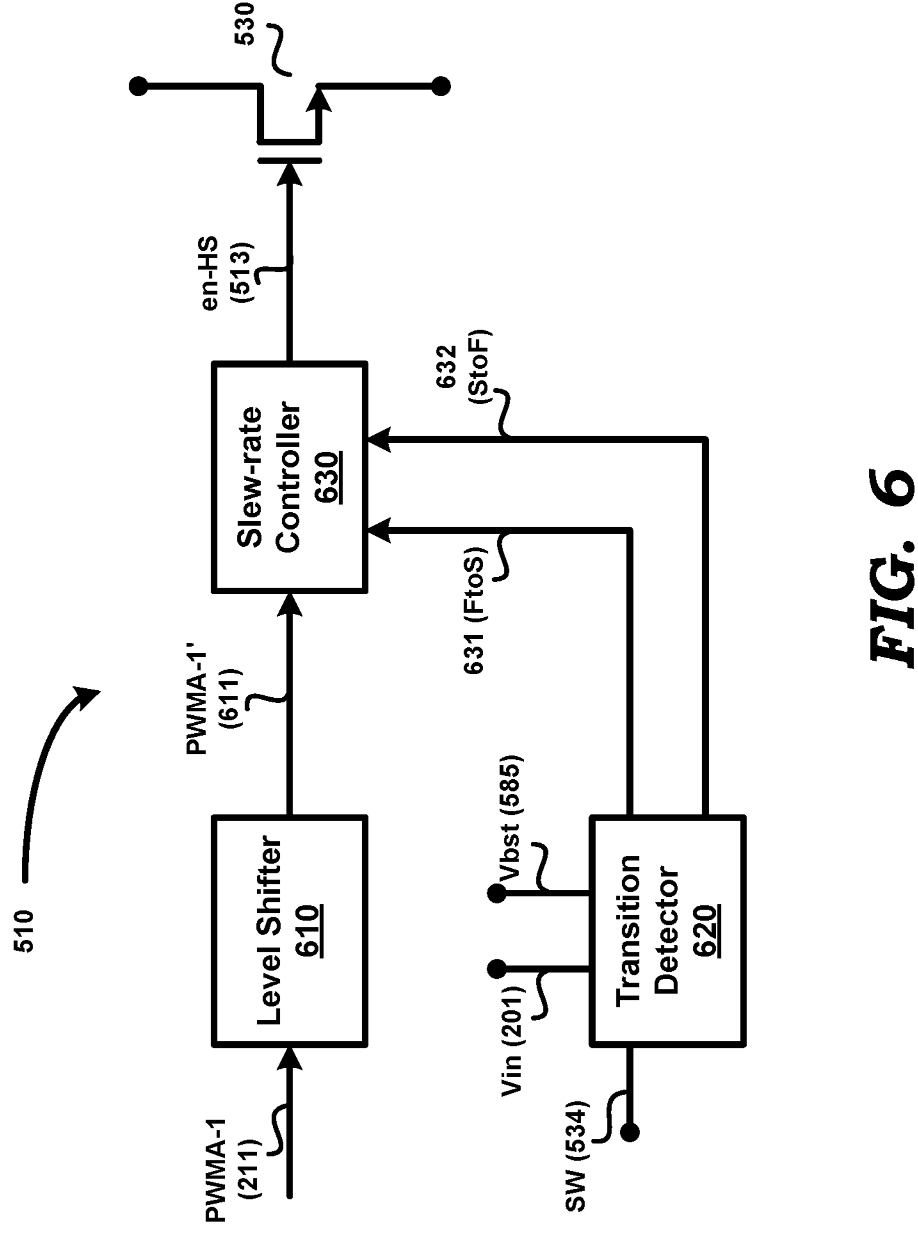
FIG. 6 is a block diagram illustrating the implementation details of a high-side gate driver in an embodiment of the present disclosure.

FIG. 6 is a block diagram illustrating the details of a HS gate driver in an embodiment of the present disclosure. HS gate driver 510 is shown containing level-shifter 610, transition detector 620 and slew-rate controller 630. Only those blocks as relevant to the understanding of the disclosure are depicted in FIG. 6. However, in other embodiments, a HS gate driver can have more or fewer blocks, as will be apparent to a skilled practitioner by reading the disclosure herein.

Level shifter 610 is shown receiving signal PWMA-1 on path 211 and generates an output signal PWMA-1' on path 611 also representing the same logic level of the signal PWMA-1. Level shifter 610 translates (level-shifts) signal 211 from one voltage domain to another. Specifically, referring back to FIG. 5, it may be noted that the power supply and ground nodes of HS gate driver 510 are Vbst (585) and SW (534) respectively. The voltage levels of Vbst and SW are not fixed but change during operation of SPS 220, as is well known in the relevant arts. Due to initial charging of bootstrap capacitor 550 to at least (Vth+Vgs-delta) as noted above, the movement of node SW (which is connected to source terminal of HS switch 530) from 0V (ground 299) to Vin (201) also increases Vbst to at least (Vin+Vth+Vgs-delta), thereby enabling HS switch 530 to be fully ON. As an illustrative example, if Vin is 22V and the voltage across capacitor 550 due to initial charging is 3.3V, the voltages at boot node (Vbst, 585) and SW node (534) respectively have the following values based on state of HS switch 530 and LS switch 540:

When HS switch 530 is ON and LS switch 540 is OFF: Vbst (585)=SW(534)+(voltage across bootstrap capacitor 550)=22+3.3=25.3V; SW (534)=22V When HS switch 530 is OFF and LS switch 540 is ON: Vbst (585)=SW(534)+(voltage across bootstrap capacitor 550)=3.3V, SW (534)=0V.

It may accordingly be noted that HS gate driver 510 operates in each of a first voltage range (25.3V-22V) and a second voltage range (3.3V-0V), based on state of HS switch 530 and LS switch 540. Furthermore, HS gate driver 510 traverses through voltages (although only for very brief intervals) between the two voltage ranges when moving from one voltage range to the other. However, PWMA-1 signal received on path 211 may always be in the lower voltage range (3.3V-0V), according to input-logic specifications of SPS 220. Therefore, level shifting of the voltage levels of PWMA-1 may be necessary for reliable transfer to HS gate driver 510. Such level shifting is performed by level-shifter 610. Level-shifter 610 may be implemented in a known way.

Transition detector 620 receives voltages Vin, Vbst and SW on paths 201, 585 and 534 respectively, and generates signal FtoS on path 631 and signal StoF on path 632. Signal 631 indicates the time at which slew-rate of gate-drive voltage of HS switch 530 should transition from fast rate (first rate noted above) to slow rate (second rate noted above). Signal 632 indicates the time at which slew-rate of gate-control of HS switch 530 should transition from slow rate (second rate noted above) to fast rate (third rate noted above). In an embodiment, a logic level change from HIGH to LOW of signal FtoS indicates the transition point of the slew-rate of the gate-drive voltage from the first rate to the second rate. In the embodiment, a logic level change from LOW to HIGH of signal StoF indicates the transition point of the slew-rate of the gate-drive voltage from the second rate to the third rate.

Transition detector 620 generates a transition from logic HIGH to logic LOW on path 631 when the value of voltage at node SW (534) falls from Vin by a predetermined threshold voltage (Vthsw). It may be appreciated that a drop from Vin volts of the voltage at node SW indicates that the HS switch has begun to switch-off. The predetermined threshold (Vthsw) is generally chosen to have a value that corresponds to (and therefore is indicative of) the beginning of the Miller plateau (region 420 in FIG. 4). In an embodiment, the magnitude of the threshold is 2V. Although the specific value of 2V is noted above for the threshold, the value may be different based on the specific design of the SPS and in particular the characteristics of the HS switch. Specifically, the threshold is chosen to have a value that is strongly indicative of the start of the Miller plateau (region 420). A designer or user can determine an appropriate value of the threshold in a known way. Transition detector 620 generates a transition from logic LOW to logic HIGH on path 632 when the gate-source voltage of HS switch 530 crosses the threshold voltage Vth of HS switch 530.

Slew-rate controller 630 receives level-shifted PWM signal on path 611, signals 631 and 632 signaling the transition points of slew-rates as noted above, and generates gate-drive voltage 513 (en-HS) with the corresponding slew-rate, as described above.

When slew-rate controller 630 receives a logic LOW on path 611 (PWMA-1'), slew-rate controller 630 determines that HS switch 530 needs to be turned OFF and generates gate-drive voltage on path 513 with a first slew-rate (e.g., similar to Vgs in region 410 of FIG. 4). When slew-rate controller 630 receives a transition from logic HIGH to logic LOW on path 631 (FtoS) while the signal on path 611 (PWMA-1') is a logic LOW, slew-rate controller 630 decreases the magnitude of the slew-rate of voltage on path 513 from the first rate to a lesser second rate (the second rate may be for example as depicted by portion 420 in FIG. 4).

When slew-rate controller 630 receives a transition from logic LOW to logic HIGH on path 632 (StoF) while the signal on path 611 (PWMA-1') is logic LOW, slew-rate controller 630 increases the magnitude of slew-rate from the second rate to a higher third rate (the third rate may be for example as depicted by portion 430 in FIG. 4).

It may be noted that the second rate is less than each of the first rate and the third rate. Slew-rate controller 630 is designed not to react to any values/transitions of signals 631 and 632 other than the ones noted above. Slew-rate controller 630 may be implemented in a known way, for example, by using multiple (parallel) transistor-switches/current sources and corresponding control elements to switch-ON the corresponding ones of transistor-switches/current sources to achieve the corresponding slew-rate, etc., as is well known in the relevant arts.

Merely to illustrate, the switching-OFF of HS switch is noted next along with example values of voltages at corresponding nodes of the power stage (SPS).

In operation, when HS switch 530 is ON, the value of the applied Vgs is 3V and the voltage at node SW (534) is equal to Vin (201), i.e., 22V. HS gate driver 510 receives a logic LOW on path 211. In response, slew-rate controller 630 determines that HS switch 530 needs to be turned OFF and generates voltage on path 513 with a magnitude representing a first slew-rate of gate-control of HS switch 530. Thus, Vgs starts to reduce quickly from 3V and correspondingly, voltage at node SW (534) starts reducing from the value of 22V. As noted above with respect to the operation of comparator 700 (FIG. 7), a fall in the voltage at node SW (534) from the value Vin by a predetermined threshold Vthsw (for example, 2V) is an indication that Vgs has approached close to threshold voltage (Vth). At this point, transition detector 620 generates a transition from logic HIGH to logic LOW on path 631. In response, slew-rate controller 630 decreases the slew-rate from the first rate to a second rate (lesser than the first rate). Thus, the applied Vgs begins to reduce at a lesser rate (compared to the rate in the first sub-duration). When Vgs crosses Vth, HS switch 530 turns OFF completely. Since Vgs is falling at a slow rate during such crossing (i.e., in the Miller plateau region), currents through parasitic inductors change slowly, thus avoiding or at least minimizing the ringing effect.

When the applied Vgs crosses, i.e., falls just below (around few tens of milli-Volts but not substantially below) Vth, transition detector 620 generates a transition from logic LOW to logic HIGH on path 632. In response, slew-rate controller 630 increases the magnitude of slew-rate from the second rate to a third rate (higher than the second rate). Thus, Vgs is pulled down quickly to the reference voltage SW (i.e., voltage of node SW).

The lower-level implementation details of transition detector 620 as well as its operation are provided next in detail with respect to an embodiment of the present disclosure.

8. Transition Detector—Detection of First Transition Point

Figure 7:
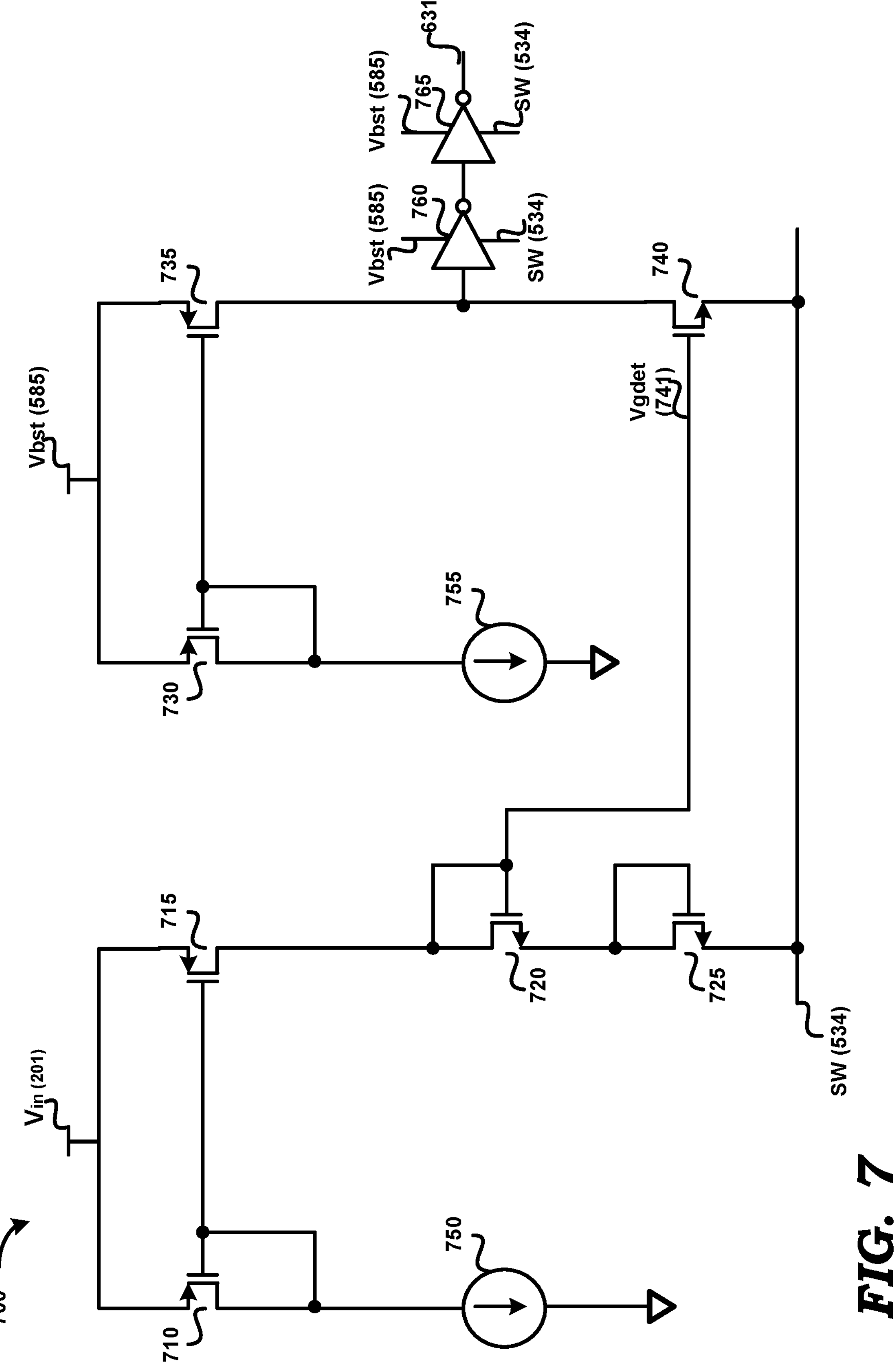
FIG. 7 is a block diagram illustrating the implementation details of a first portion of a transition detector for detecting transition from a first sub-duration to a second sub-duration, in an embodiment of the present disclosure.

FIG. 7 is a diagram illustrating a portion (comparator circuit 700) of the implementation details of transition detector 620 for the identification of transition between the first sub-duration and the second sub-duration (transition into the Miller plateau) in an embodiment of the present disclosure. Comparator circuit 700 is shown containing constant-current sinks 750 and 755, N-channel metal-oxide-semiconductor field effect transistor (NMOS) transistors 720, 725, 740, P-channel metal-oxide-semiconductor field effect transistor (PMOS) transistors 710, 715, 730, 735, and inverters 760 and 765. It is understood that comparator circuit 700 can contain more or fewer blocks than those shown in FIG. 7 in alternative embodiments, as will be apparent to a skilled practitioner by reading the disclosure herein.

Transistors 710 and 715 form a current mirror-pair. Transistors 730 and 735 form a current mirror-pair. A current determined by current-sink 750 flows in the series path formed by transistor 710 and current-sink 750. Similarly, a current determined by current-sink 755 flows in the series path formed by transistor 730 and current-sink 755.

Comparator 700 detects the voltage at node SW (534) becoming less than Vin (201) by a predetermined threshold. The magnitude of the predetermined threshold may be specified by user (via corresponding means not shown, but which would be apparent to a skilled practitioner) or may be a value read from a register configured at design time of power stage 220. In an embodiment, the magnitude of the predetermined threshold is 2V.

Comparator 700 is shown as operating with the voltage at node SW (534) as the reference voltage. Assuming example values of Vin equals 22V, Vcc (bias voltage) equals 3V, drop (Vt) across each of the diode-connected transistors 720 and 725 equals 1V in the illustrative embodiment, the various magnitudes of some relevant voltages are:

In the duration when HS switch 530 is ON (and LS switch 540 is OFF):

SW (534)=Vin (201)=22V;

Vbst (585)=Vin+Vcc=25V;

Voltage at gate terminal, Vgdet (741), of NMOS transistor 740=Vin (201)=22V;

Voltage at source terminal of NMOS transistor 740=SW (534)=22V.

Therefore, Vgs of NMOS transistor 740=0V.

Accordingly, NMOS transistor 740 is OFF, and therefore input voltage to inverter 760 is Vbst (585)=25V. Thus, output 631 is at voltage Vbst (585), representing a logic HIGH output of inverter 765.

In the duration when LS switch 540 is ON (and HS switch 530 is OFF):

SW (534)=0V;

Vbst (585)=Vcc=3V;

Voltage at gate terminal, Vgdet (741), of NMOS transistor 740=2 Vt;

Voltage at source terminal of NMOS transistor 740=SW (534)=0V.

Therefore, Vgs of NMOS transistor 740=2Vt.

Accordingly, NMOS transistor 740 is ON, and therefore input voltage to inverter 760 is VSW (534)=0V. Thus, output 631 is at voltage of SW (534) node, representing a logic LOW output of inverter 765.

In the duration of switching-OFF of HS switch 530:

Vbst (585)=Vin+Vcc=25V;

When voltage SW (534) is close to (Vin−2V), voltage at gate terminal, Vgdet (741), of NMOS transistor 740=SW (534)+2Vt≈22V.

Voltage at source terminal of NMOS transistor 740=SW (534)=(Vin minus 2V)=20V.

Therefore, Vgs of NMOS transistor 740≈2V.

Accordingly, NMOS transistor 740 switches ON, and input voltage to inverter 760 changes to the voltage at node SW (534), i.e., 20V. Consequently, output 631 transitions from logic HIGH to logic LOW.

It may be appreciated that comparator circuit 700 as well as slew-rate controller 630 are implemented within HS gate driver 510 which is not referenced to ground potential (zero volts) but instead to the voltage at SW node. Therefore, level-shifting of comparison result 631 is not required, and slew-rate controller 630 can directly use signal 631. It may also be appreciated that alternative comparator circuits would require level-shifting to accommodate the large voltages noted above (e.g., Vbst, Vin, SW) and therefore would be slow in operation, which would be undesirable as the specification of switch-OFF duration of HS switch is typically just a few nano-seconds.

The description is continued to illustrate the manner in which transition detector 620 detects the transition from the second sub-duration to the third sub-duration.

9. Transition Detector—Detection of Second Transition Point

Figure 8B:
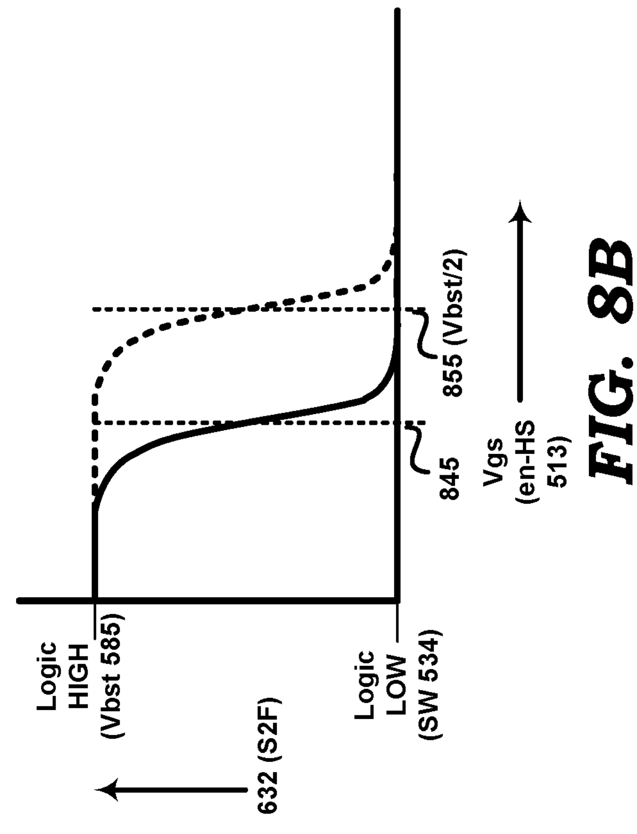
FIGS. 8A and 8B are diagrams respectively illustrating the implementation details and switching thresholds of a second portion of a transition detector for detecting transition from the second sub-duration to a third sub-duration, in an embodiment of the present disclosure.
Figure 8A:
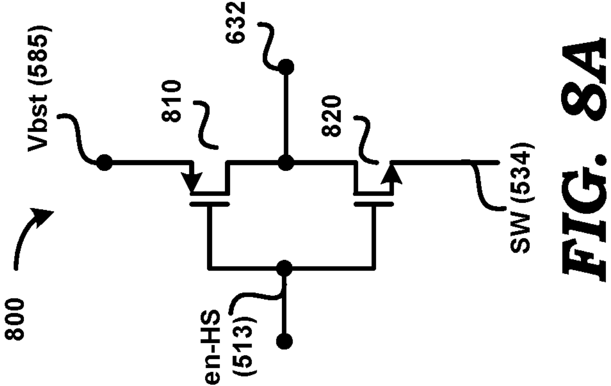

FIGS. 8A and 8B respectively illustrate the implementation details and corresponding switching thresholds (trip-points) of skewed inverter implemented within transition detector 620 in an embodiment of the present disclosure. FIG. 8A is a diagram of an inverter (800) shown as containing PMOS transistor 810 and NMOS transistor 820. Also shown are gate-drive voltage Vgs (en-HS 513), power supply Vbst (585) and reference voltage SW (534). In an embodiment, inverter 800 is implemented as a low-skewed inverter. As is well known in the relevant arts, a low-skewed inverter is implemented with a stronger NMOS (820) and a weak PMOS (810). Skewed inverter 800 is used to indicate when transition of the slew-rate of the gate-drive voltage (513) of HS switch should be changed from the second rate to the third rate.

FIG. 8B illustrates an example switching threshold of inverter 800 in comparison to a normal (non-skewed) inverter. Specifically, in a normal inverter, the trip-point (at which the logic level of the output of the inverter switches) is close to half of the power supply (here Vbst/2), as depicted by voltage 855 in the dotted curve of FIG. 8B. For low-skewed inverter 800, the trip-point is closer to reference voltage (SW here) than to power supply voltage (Vbst), as is also well known in the relevant arts. In an embodiment, inverter 800 is designed such that the trip-point 845 is equal to the threshold voltage, Vth, of HS switch 530. An example value of Vth is 0.7V. Thus, when input gate-drive voltage 513 crosses Vth, inverter 800 transitions from logic LOW to logic HIGH on path 632. The change of logic level from LOW to HIGH of signal 632 indicates to slew-rate controller 630 that the transition from the second rate to the third rate should now occur.

Thus, aspects of the present disclosure provide application of drive voltages on the gate terminal of the HS switch in a controlled manner such as to avoid or at least minimize any undesirable effects (such as ringing, high-voltage stress, etc.). Such control is achieved by detecting the appropriate time instants for transitions from one slew-rate to another.

10. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 3, 5, 6, 7 and 8 although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A power stage comprising:

a high-side switch and a low-side switch connected in series at a switching node, said high-side switch and said low-side switch being connected in series between a power terminal provided with a power source and a constant reference potential;

an inductor coupled between said switching node and an output node at which said power stage provides a regulated voltage;

a high-side gate driver to apply a first control signal at a first control terminal of said high-side switch to place said high-side switch in ON and OFF states in successive durations; and a low-side gate driver to apply a second control signal at a second control terminal of said low-side switch to place said low-side switch in OFF and ON states in corresponding successive durations to cause generation of said regulated voltage, to transition said high-side switch from said ON state to said OFF state, said high-side gate driver changing a magnitude of said first control signal at a first rate, a second rate and then in a third rate in three consecutive sub-durations comprising a first sub-duration, a second sub-duration and a third sub-duration respectively, wherein said second rate is less than each of said first rate and said third rate, said high-side gate driver determining a first transition between said first sub-duration and said second sub-duration as being when a voltage at said switching node becomes less than a voltage at said power terminal by a first threshold voltage, wherein said first threshold voltage corresponds to said voltage of said first control signal at a start of Miller Plateau during said transition from said ON state to said OFF state.

2. The power stage of claim 1, wherein said high-side gate driver determines a second transition between said second sub-duration and said third sub-duration as being when a voltage of said first control signal crosses a threshold voltage of said high-side switch.

3. The power stage of claim 2, wherein said high-side gate driver comprises a skewed inverter having a trip-point equal to said threshold voltage of said high-side switch such that an output of said skewed inverter represents said second transition.

4. The power stage of claim 2, wherein said high-side switch and said low-side switch respectively provide said regulated voltage in a first phase and a second phase periodically based on an input control signal received from a component external to said power stage.

5. The power stage of claim 4, wherein in said first phase, said input control signal is a logic HIGH, said high-side switch is ON and said low-side switch is OFF, wherein in said second phase, said input control signal is a logic LOW, said high-side switch is OFF and said low-side switch is ON, wherein a bootstrap capacitor is coupled between a bootstrap terminal and said switching node.

6. The power stage of claim 1, wherein said high-side gate driver comprises a comparator circuit whose reference voltage is the voltage of said switching node.

7. The power stage of claim 6, wherein said comparator circuit generates a first transition signal indicating a first time instant at which said first transition is to occur, wherein said comparator circuit transitions said first transition signal to a logic LOW at said first time instant.

8. The power stage of claim 6, wherein said comparator circuit comprises:

a first transistor, wherein a first current terminal of said first transistor is coupled to said power terminal, a second current terminal of said first transistor is coupled to a control terminal of said first transistor;

a second transistor, wherein a first current terminal of said second transistor is coupled to said power terminal, a control terminal of said second transistor is coupled to said control terminal of said first transistor;

a third transistor, wherein a first current terminal of said third transistor is coupled to a second current terminal of said second transistor, wherein first current terminal of said third transistor is coupled to a control terminal of said third transistor;

a fourth transistor, wherein a first current terminal of said fourth transistor is coupled to a second current terminal of said third transistor, wherein said first current terminal of said fourth transistor is coupled to a control terminal of said fourth transistor, wherein a second current terminal of said fourth transistor is coupled to said switching node;

a fifth transistor, wherein a first current terminal of said fifth transistor is coupled to said bootstrap terminal, a second current terminal of said fifth transistor is coupled to a control terminal of said fifth transistor;

a sixth transistor, wherein a first current terminal of said sixth transistor is coupled to said bootstrap terminal, wherein a control terminal of said sixth transistor is coupled to said control terminal of said fifth transistor;

a first current-sink coupled between said second current terminal of said first transistor and said constant reference potential, a second current-sink coupled between said second current terminal of said fifth transistor and said constant reference potential;

a seventh transistor, wherein a first current terminal of said seventh transistor is coupled to a second current terminal of said sixth transistor, wherein a control terminal of said seventh transistor is coupled to said control terminal of said third transistor, wherein a second current terminal of said seventh transistor is coupled to said switching node;

a first inverter, wherein an input node of said first inverter is coupled to said second current terminal of said sixth transistor; and a second inverter, wherein an input node of said second inverter is coupled to an output node of said first inverter, wherein an output node of said second inverter corresponds to said first transition signal.

9. A voltage regulator module (VRM) comprising:

a phase controller to generate a regulated supply voltage on a first supply node;

an inductor having a first terminal coupled to said first supply node; and a power stage comprising:

a high-side switch and a low-side switch connected in series at a switching node, said high-side switch and said low-side switch being connected in series between a power terminal provided with a power source and a constant reference potential, said high-side switch and a low-side switch to respectively drive said inductor in a first phase and a second phase periodically based on an input control signal received from said phase controller, wherein a second terminal of said inductor is coupled to said switching node;

a high-side gate driver to apply a first control signal at a first control terminal of said high-side switch to place said high-side switch in ON and OFF states in successive durations; and a low-side gate driver to apply a second control signal at a second control terminal of said low-side switch to place said low-side switch in OFF and ON states in corresponding successive durations to cause generation of said regulated voltage, to transition said high-side switch from said ON state to said OFF state, said high-side gate driver changing a magnitude of said first control signal at a first rate, a second rate and then in a third rate in three consecutive sub-durations comprising a first sub-duration, a second sub-duration and a third sub-duration respectively, wherein said second rate is less than each of said first rate and said third rate, said high-side gate driver determining a first transition between said first sub-duration and said second sub-duration as being when a voltage at said switching node becomes less than a voltage at said power terminal by a first threshold voltage, wherein said first threshold voltage corresponds to said voltage of said first control signal at a start of Miller Plateau during said transition from said ON state to said OFF state.

10. The VRM of claim 9, wherein said high-side gate driver comprises a transition detector to determine a first time instant at which said first transition is to occur and a second time instant at which a second transition between said second sub-duration and said third sub-duration is to occur; and a slew-rate controller to change the magnitude of said first control signal based on the indication of said first transition and said second transition.

11. The VRM of claim 10, wherein said transition detector determines said second transition as being when a voltage of said first control signal crosses a threshold voltage of said high-side switch.

12. The VRM of claim 10, wherein said transition detector comprises a skewed inverter having a trip-point equal to said threshold voltage of said high-side switch such that an output of said skewed inverter represents said second transition.

13. The VRM of claim 10, wherein said transition detector comprises a comparator circuit whose reference voltage is the voltage of said switching node, wherein said comparator circuit generates a first transition signal indicating said first time instant, wherein said comparator circuit transitions said first transition signal to a logic LOW at said first time instant.

14. The VRM of claim 13, wherein said comparator circuit comprises:

a first transistor, wherein a first current terminal of said first transistor is coupled to said power terminal, a second current terminal of said first transistor is coupled to a control terminal of said first transistor;

a second transistor, wherein a first current terminal of said second transistor is coupled to said power terminal, a control terminal of said second transistor is coupled to said control terminal of said first transistor;

a third transistor, wherein a first current terminal of said third transistor is coupled to a second current terminal of said second transistor, wherein first current terminal of said third transistor is coupled to a control terminal of said third transistor;

a fourth transistor, wherein a first current terminal of said fourth transistor is coupled to a second current terminal of said third transistor, wherein said first current terminal of said fourth transistor is coupled to a control terminal of said fourth transistor, wherein a second current terminal of said fourth transistor is coupled to said switching node;

a fifth transistor, wherein a first current terminal of said fifth transistor is coupled to said bootstrap terminal, a second current terminal of said fifth transistor is coupled to a control terminal of said fifth transistor;

a sixth transistor, wherein a first current terminal of said sixth transistor is coupled to said bootstrap terminal, wherein a control terminal of said sixth transistor is coupled to said control terminal of said fifth transistor;

a first current-sink coupled between said second current terminal of said first transistor and said constant reference potential, a second current-sink coupled between said second current terminal of said fifth transistor and said constant reference potential;

a seventh transistor, wherein a first current terminal of said seventh transistor is coupled to a second current terminal of said sixth transistor, wherein a control terminal of said seventh transistor is coupled to said control terminal of said third transistor, wherein a second current terminal of said seventh transistor is coupled to said switching node;

a first inverter, wherein an input node of said first inverter is coupled to said second current terminal of said sixth transistor; and a second inverter, wherein an input node of said second inverter is coupled to an output node of said first inverter, wherein an output node of said second inverter indicates said first transition.

15. The VRM of claim 10, wherein in said first phase, said input control signal is a logic HIGH, said high-side switch is ON and said low-side switch is OFF, wherein in said second phase, said input control signal is a logic LOW, said high-side switch is OFF and said low-side switch is ON, wherein a bootstrap capacitor is coupled between a bootstrap terminal and said switching node.

16. The VRM of claim 10, wherein said slew-rate controller changes the magnitude of said first control signal from said first rate to said second rate at said first time instant, wherein said slew-rate changes the magnitude of said first control signal from said second rate to said third rate at said second time instant.

17. A power stage comprising:

a high-side switch and a low-side switch connected in series at a switching node, said high-side switch and said low-side switch being connected in series between a power terminal provided with a power source and a constant reference potential;

an inductor coupled between said switching node and an output node at which said power stage provides a regulated voltage;

a high-side gate driver to apply a first control signal at a first control terminal of said high-side switch to place said high-side switch in ON and OFF states in successive durations; and a low-side gate driver to apply a second control signal at a second control terminal of said low-side switch to place said low-side switch in OFF and ON states in corresponding successive durations to cause generation of said regulated voltage, to transition said high-side switch from said ON state to said OFF state, said high-side gate driver changing a magnitude of said first control signal at a first rate, a second rate and then in a third rate in three consecutive sub-durations comprising a first sub-duration, a second sub-duration and a third sub-duration respectively, wherein said second rate is less than each of said first rate and said third rate, said high-side gate driver determining a first transition between said first sub-duration and said second sub-duration as being when a voltage at said switching node becomes less than a voltage at said power terminal by a first threshold voltage, wherein said high-side switch and said low-side switch respectively provide said regulated voltage in a first phase and a second phase periodically based on an input control signal received from a component external to said power stage, wherein a bootstrap capacitor is coupled between a bootstrap terminal and said switching node, wherein a first current terminal of said high-side switch is coupled to said power terminal and a second current terminal of said high-side switch is coupled to a first current terminal of said low-side switch, wherein a second current terminal of said low-side switch is coupled to said constant reference potential, wherein said high-side gate driver comprises:

a level-shifter, wherein said level-shifter is configured to receive said input control signal on a first node, said level-shifter to generate an output control signal also representing the same logic level of said input control signal;

a transition detector, wherein said transition detector is configured to receive the voltage at said power terminal, the voltage at said switching node and the voltage at said bootstrap terminal, and generates a first transition signal indicating said first transition and a second transition signal indicating a second transition between said second sub-duration and said third sub-duration, wherein said transition detector determines said second transition as being when a voltage of said first control signal crosses a threshold voltage of said high-side switch; and a slew-rate controller, said slew-rate controller is configured to receive said output control signal, said first transition signal and second transition signal, and to generate said first control signal, wherein said transition detector comprises:

a comparator whose reference voltage is the voltage of said switching node, wherein said comparator circuit determines a first time instant at which said first transition is to occur and transitions said first transition signal to a logic LOW at said first time instant; and a skewed inverter having a trip-point equal to said threshold voltage of said high-side switch such that an output of said skewed inverter represents a second time instant at which said second transition is to occur, wherein said skewed inverter generates a transition from logic LOW to logic HIGH at said second time instant.

18. The power stage of claim 17, wherein said voltage at said switching node is substantially equal to said voltage at said power terminal at a start of said first sub-duration and falls in each of said first sub-duration and said second sub-duration.

19. The power stage of claim 17, wherein said first threshold voltage corresponds to said voltage of said first control signal at a start of Miller Plateau during said transition from said ON state to said OFF state.

* * * * *